FIP8102 OR 3,469,191

X5283R

X5234E

Sept. 23, 1969 D. D. RUSSELL, JR., ETAL 3,469,191

TRANSMISSION TIME LIMITING

Filed Aug. 31, 1966

INVENTORS
DANIEL D. RUSSELL JR
PAUL H. JACOBS &
LARRY R. WRIGHT

By Mueller, Aichele & Rauner
ATTYS.

United States Patent Office 3,469,191
Patented Sept. 23, 1969

3,469,191
TRANSMISSION TIME LIMITING

Daniel D. Russell, Jr., Harwood Heights, Paul H. Jacobs, Melrose Park, and Larry R. Wright, Franklin Park, Ill., assignors to Motorola, Inc., Franklin Park, Ill., a corporation of Illinois Filed Aug. 31, 1966, Ser. No. 576,475
Int. Cl. H04b *1/04*
U.S. Cl. 325—133 8 Claims

ABSTRACT OF THE DISCLOSURE

Control systems for limiting duration of continuous transmission from a transmitter operating with other transmitters on a single channel, and wherein the transmitter is actuated for each operation. A timing unit has a capacitor which is normally charged through a transistor circuit, with the transistor circuit disconnecting the capacitor from its charging voltage when a transmission is initiated. A threshold circuit connected to the capacitor actuates a semiconductor switch when the voltage falls to a predetermined value representing a given time duration, to apply a low impedance path to a tuned circuit in the transmitter to inhibit the emission of carrier signals. The timing unit also actuates a tone generator for producing an audio signal to alert the operator that the transmitter is disabled.

This invention relates to transmitters which produce a carrier signal and controls therefor and particularly to transmitters sharing a transmission path with other transmitters.

This invention is a specific form of the invention described and claimed in application Ser. No. 576,474 of John W. Battin and Jimmy Paul Combs, filed Aug. 31, 1966.

In single-path radio or wire networks having a plurality of transmitters, only one transmitter may emit signals at any given time. In transmitters utilizing AC carrier signals the transmission of such AC carrier, with or without modulation, prevents other transmitters from using the network. The carrier signal transmission indicates a transmitter has been actuated for transmission. In single-path wire networks utilizing keyed DC current, a transmitter, such as a transmitter-distributor, indicates to a wire line network that it is ready to transmit by supplying a current to the line. The term "carrier" or "carrier signal" as used herein is intended to include all types of transmission indicating signals usable in communication networks.

In the event a transmitter becomes permanently keyed, such that a carrier signal is continuously transmitted, the network becomes unusable. Further, one transmitter by continuously transmitting may tie up the network preventing other transmitters from transmitting. It is, therefore, desired to limit the time a transmitter may continuously emit a carrier or other transmission indicating signal.

Accordingly, it is an object of this invention to provide solid state controls for transmitters which time limits each continuous transmission.

It is another object of this invention in combination with the immediately preceding object to provide an operator indicating signal when a transmitter has exceeded the predetermined permitted transmission time.

It is another object of this invention to provide a transmitter having a solid state control for time limiting continuous transmission, which control acts with electronic speeds to suppress the carrier and to be automatically reset upon termination of a continuous transmission.

According to this invention a transmitter and a control is provided having a timing unit which measures the continuous transmission time of the transmitter, each time the transmitter is turned on. The timing unit indicates expiration of a predetermined time limit of continuous transmission. The indication actuates a control into an active condition for blocking further emission of a carrier. Such blocking may be provided in a tuned circuit of the transmitter carrier signal portion, that is, within the modulator, frequency multipliers, output amplifiers, or IF amplifiers.

Additionally, upon the control going into an active condition, an indicating signal is provided to the transmitter operator. In one form the signal may be an audio tone provided through a receiver adjacent the transmitter. Upon termination of any transmission, such as by the release of a push-to-talk switch, the timing unit is automatically reset to an initial condition for permitting another continuous transmission of carrier signals up to the predetermined time limit.

Referring now to the accompanying drawing.

According to this invention a timing unit is provided in a transmitter and actuated whenever the transmitter is activated to transmit a carrier signal. The timing unit includes a transistorized circuit with a resistor-capacitor time constant circuit. Before transmission of carrier, the capacitor is charged to a first voltage amplitude. Upon activation of the transmitter, the capacitor is isolated from its charging source by a transistor switch and discharges through the timing resistor which measures the elapsed time the transmitter has been activated. Upon expiration of a predetermined time, the capacitor voltage reaches a time limit indicating amplitude for actuating an electro-responsive switch. The switch, which may include a silicon controlled rectifier, rapidly changes from a high impedance to a low impedance. The low impedance is connected to the modulator or other tuned circuits in the carrier signal section of the transmitter for detuning the tuned circuit such that no signals are transferred from the circuit input to the circuit output. In this way, the carrier is quickly suppressed upon expiration of the time limit.

A resistor may be provided in series circuit with the silicon controlled rectifier, and as the rectifier begins to conduct a substantial voltage differential is developed across the resistor. A tone generator, such as a relaxation oscillator, is connected across the resistor and is actuated into oscillation by the voltage differential. The tone generator output signal may be applied to the audio section of a radio receiver, for example, for indicating to the operator that the predetermined time limit has expired.

Upon release of a push-to-talk switch or deactivation of the transmitter, the capacitor charging circuit is automatically reconnected to the capacitor for recharging it to the initial condition for permitting subsequent carrier transmission.

As used herein, the term "carrier" is intended to include any carrier frequency signal and all the attendant modulation components and any other transmission indicating signal, including a DC current provided to wire lines.

Figure 1:
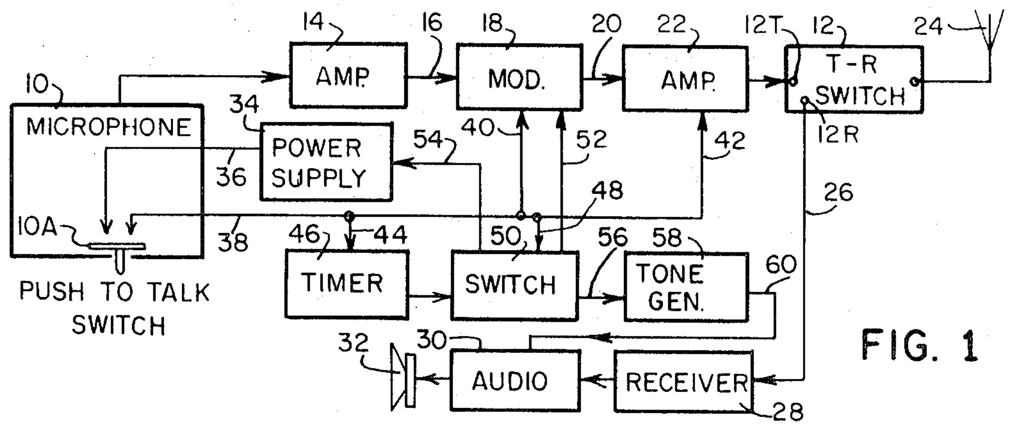
FIG. 1 is a block diagram of a transmitter-receiver combination incorporating the teachings of this invention.

Referring now more particularly to FIG. 1, a transmitter-receiver combination is used to illustrate this invention. Microphone 10, includes push-to-talk switch 10A for activating the transmitter, is connected to audio amplifier 14. The amplified audio signals are provided over line 16 to modulator 18. In this diagram, modulator 18 is intended to include the carrier frequency oscillator and the various frequency multiplying circuits found in frequency modulation transmitters, no limitation thereto being intended. The carrier signal is provided over line 20 to output amplifier 22. The carrier signal is then provided through terminal 12T and transmit-receiver (TR) switch 12 to antenna 24. Upon release of push-to-talk button 10A, TR switch 12 connects terminals 12R to antenna 24. Incoming signals intercepted by antenna 24 are provided through the TR switch 12, over line 26 to receiver 28, which contains the RF amplifiers, detectors and IF sections. Audio amplifier section 30 receives the detected signal from receiver 28 and provides such signals to speaker 32 or other audio output transducer.

Power supply 34 (a battery, voltage regulator or any suitable source of potential) supplies voltages to all components shown in the diagram in the usual manner. Additionally, it supplies over line 36 and through push-to-talk switch 10A an operating voltage to modulator 18 and amplifier 22, enabling the transmission of a carrier signal through antenna 24. It is to be understood that the indicated connection of switch 10A is schematic. In a practical transmitter there may be interposed relays or transistors for reducing impedances in the power supply lines and for protecting the operator from voltages attendant the power supply 34 and the generation, amplification and emission of a carrier signal. Voltage from power supply 34 is provided over line 38 and thence over line 40 to modulator 18 and line 42 to amplifier 22. In addition to the above described connections, the voltage is also supplied over line 44 to timer 46 which measures the elapsed time that such voltage has been continuously provided over the lines 40 and 42. Such voltage is also supplied over line 48 to switch circuit 50 which is responsively connected to timer 46 such that when a predetermined continuous transmission time limit has been exceeded, as indicated by the continuous supply of voltage over line 38, switch circuit 50 is actuated to its active condition. Switch circuit 50 is connected by line 52 to modulator 18 for detuning the modulator such that no signal can pass therethrough, thereby inhibiting emission of a carrier signal. Alternatively, switch circuit 50 may be connected to amplifier 22 or TR switch 12 for blocking the carrier signal therein. It is preferred, however, to block the signal at its lowest energy level. As another alternative, line 54 connecting switch 50 to power supply 34 is indicated. By use of this connection, switch 50 can partly deactivate power supply 34 such that no voltage is provided to certain portions of the transmitter.

Simultaneously, with the suppression of or blocking the carrier signal, an indicating signal is provided over line 56 to actuate tone generator 58. A tone signal is provided over line 60 into audio section 30 for producing a tone in speaker 32 indicating to the operator that the carrier and its modulation components are being blocked because of the expiration of the transmission time limit.

As used herein the term "carrier signal section" of the transmitter is intended to indicate those portions of the transmitter directly associated with generation, amplification, and emission of a carrier signal, such as modulator 18, amplifier 22, TR switch 12, antenna 24 and that portion of power supply 34 providing a voltage over line 38 for activating modulator 18 and amplifier 22.

Figure 2:
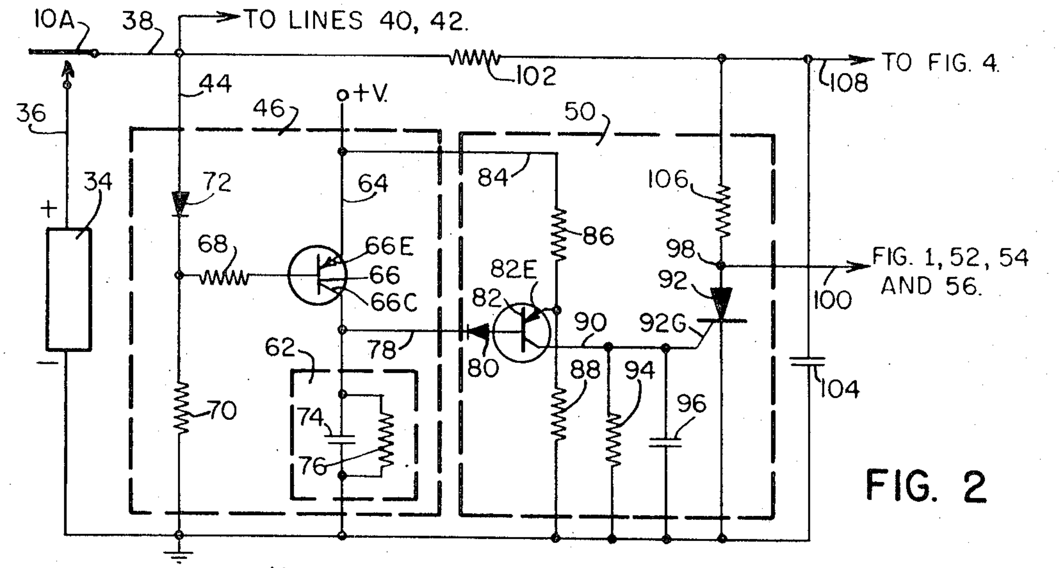
FIG. 2 is a schematic diagram of a timing unit and tone generator as may be used in the FIG. 1 embodiment.

Referring now to FIG. 2, the timing unit 46 is shown as including resistance-capacitance timing element 62. A voltage supply +V is continuously provided over line 64 to the emitter portion 66E of transistor switch 66. The voltage applied to line 64 must be lower than the voltage applied by power supply 34 to line 38. Transistor switch 66 is normally (switch 10A open) conducting current from source +V due to the bias provided by current flowing through the emitter 66E and thence out the base electrode through resistors 68 and 70 to ground reference potential. The base current is such that the diode 72 is reversed biased. Current through collector 66C rapidly charges capacitor 74 of timing element 62. After capacitor 74 has been charged, current from transistor switch 66 flows through timing resistor 76 to ground reference potential.

Timing action of unit 46 is initiated by closing push-to-talk switch 10A and providing voltage over line 44 to forward bias diode 72. This action provides a positive voltage at the juncture of resistors 68 and 70 and thereby reverse biases transistor switch 66 to non-conduction. Timing element 62 then is isolated from its supply voltage +V. Capacitor 74 discharges its positive charge through resistor 76. A typical time constant for discharging capacitor 74 is one minute.

Electroresponsive switch 50 receives the voltage on capacitor 74 of the timing unit 46 over line 78 and through isolation diode 80. This voltage is applied to the base electrode of transistor 82, and diode 80 protects the transistor from positive voltages on capacitor 74. The +V voltage is connected over line 84 to a voltage divider including resistors 86 and 88. This divider applies a voltage to the emitter electrode 82E of transistor 82 which sets the voltage at which transistor 82 will conduct. When the voltage on capacitor 74 has reached the time limit expiration indicating amplitude, transistor 82 is biased to current conduction. Operation of transistor 82 is that of a switch, i.e., it rapidly changes from current non-conduction to conduction. Current from transistor 82 is supplied over line 90 to gate electrode 92G of silicon controlled rectifier 92, for rapidly switching the rectifier from current non-conduction to conduction, i.e., to an extremely low impedance. Resistor 94 and capacitor 96 are coupled between line 90 and ground reference potential. Rectifier 92 is such that once conduction is initiated it remains on until the anode current falls below some fixed value. Sufficient current is supplied through resistor 106 to hold rectifier 92 conducting. The low impedance of rectifier 92 as measured between junction 98 and ground reference potential is provided over line 100 to all applicable units of the transmitter, i.e., line 100 is equivalent to lines 52, 54 and 56 which extend from the switch circuit 50 in FIG. 1.

The power supply 34 voltage as supplied through switch 10A is provided over line 38, thence through filter resistor 102, resistor 106 and junction 98 to the rectifier 92. Capacitor 104 coacts with resistor 102 to suppress noise from closure of switch 10A.

As soon as rectifier 92 has been biased to current conduction, a large current flows through resistor 106 generating a substantial voltage differential thereacross. This voltage differential is supplied between lines 100 and 108 to actuate tone generator 58, as later described.

Figure 3:
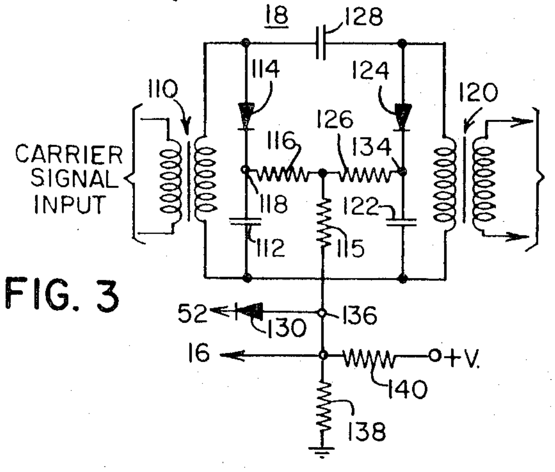
FIG. 3 is a partial schematic diagram of a modulator in which the carrier signal may be blocked by the FIG. 2 timing unit.

Referring now to the FIG. 3 illustrated modulator, the low impedance of rectifier 92 (FIG. 2) is provided thereto over line 52. The modulator consists of an input transformer 110 which receives the carrier signal. The carrier signal frequency at this point may be lower than the frequency of the signal emitted by antenna 24. The secondary of transformer 110 is tuned by capacitor 112 in series with varactor diode 114. A varactor diode is a diode that when reverse biased exhibits a capacitance which varies with the amplitude of the reverse biasing voltage. The output transformer 120 of the modulator has its primary winding in a portion of a tuned circuit including capacitor 122 and varactor diode 124. Coupling capacitor 128 between the two tuned circuits completes the modulator.

The modulating signal is provided over line 16 through resistors 115 and 116 to junction 118 between varactor diode 114 and capacitor 112, and through resistors 115 and 126 to the junction 134 between varactor diode 124 and capacitor 122. The modulating signal serves to vary the reverse bias of diodes 114 and 124 and thereby the capacitances thereof according to a modulating rate, which then varies the phase of the carrier signal passing from carrier signal input transformer 110 to output transformer 120. A voltage divider including resistors 138 and 140 establishes the voltage at junction 136 which is applied to the varactor diodes to determine the center frequency of the tuned circuits of the modulator.

The described modulator additionally has clamp diode 130 connected from line 52 to junction 136. Line 52 is connected to rectifier 92 in FIG. 2, and as rectifier 92 normally presents a high impedance to line 52 this connection does not enter into the modulator operation. Diode 130 is held nonconductive by the potential on line 52, which is at a higher potential than junction 136 even during modulation. However, when rectifier 92 is switched to a low impedance by timing unit 46, line 52 is clamped at ground reference potential. At this time clamp diode 130 is forward biased and clamps junction 136 and also junctions 118 and 134 to ground reference potential. This action changes the capacitance of varactor diodes 114 and 124 of the modulator tuned circuits, effectively detuning the modulator. The carrier signal input transformer 110 is thereby decoupled from output transformer 120, and the emission of a carrier signal is inhibited.

Figure 4:
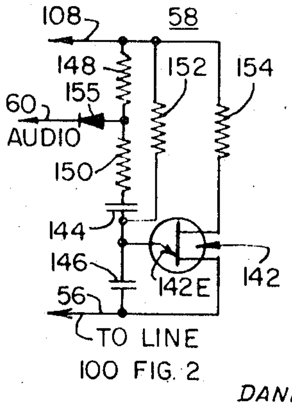
FIG. 4 is a schematic diagram of a relaxation type of a tone generator.

FIG. 4 illustrates the tone generator 58 of FIG. 1 which is actuated simultaneously with the blocking of the carrier. Generator 58 is connected across the resistor 106 (FIG. 2) through lines 108 and 56, the latter line being connected to line 100 of FIG. 2. As illustrated, the tone generator is a relaxation type of oscillator constructed with unijunction transistor 142. The emitter electrode 142E is connected to the junction of capacitors 144 and 146, and resistor 152 completes the timing circuit. As voltage is applied between lines 108 and 56, capacitor 146 charges through resistor 152. When the voltage across capacitor 146 reaches the firing voltage of unijunction transistor 142, this transistor switches from a high impedance to a low impedance and discharges capacitor 146. Transistor 142 then returns to its high impedance condition so that capacitor 146 charges again to repeat the cycle. The values of resistors 152 and capacitor 146 are related to the applied voltage to control the frequency of repetition, which may be of the order of 2,000 cycles per second. The audio signal generated is coupled through capacitor 144 and resistor 150 to diode 155. Diode 155 applies the audio signal to line 60 so that the generated tone signal is applied to audio section 30 as shown in FIG. 1.

The system of the invention has been found to be highly effective to limit the time of individual transmissions in a radio network. This makes it possible to use the network with the greatest efficiency and prevents disabling of the network because of improper operation of one transmitter. The operator is alerted to the timing action and can therefore make a second call to complete a message if this is required.

We claim:

1. A transmitter control for limiting the time of continuous emission of energy from a transmitter, including in combination, timing means having a capacitor and being selectively operative to alter the capacitor voltage from a reference amplitude to an activating amplitude in a predetermined time, voltage means for supplying a reference voltage, a semiconductor switch for selectively coupling said voltage means to said timing means capacitor for charging said capacitor to said reference amplitude, said switch being responsive to the transmission of energy by the transmitter for selectively decoupling said capacitor from the voltage means such that the voltage on said capacitor discharges toward said activating voltage amplitude, and impedance switching means operatively connected to said timing means and being responsive to the activating voltage amplitude for selectively providing a low impedance path, said impedance switching means being adapted to be connected to the transmitter for effectively inserting said low impedance path therein for inhibiting the transmission of energy thereby.

2. The combination of claim 1 further including operator indicator means connected to said impedance switching means and being responsive to a voltage produced by the low impedance path to supply an alerting signal.

3. The combination of claim 2 wherein said operator indicating means includes an audio tone generator.

4. In a transmitter having a carrier signal section with tuned circuit means and switch means for selectively actuating the section for causing emission of carrier signals;

the improvement including in combination, timing means including a capacitor and being connected to the transmitter and being responsive to actuation of the switch means for causing emission of carrier signals to alter the capacitor voltage toward an elapsed-time indicating voltage amplitude, reference voltage means connected to said capacitor and being responsive to deactuation of the carrier signal section for selectively rapidly altering and holding the capacitor voltage to a reference amplitude, a voltage threshold switch connected to the timing means and being responsive to said elapsed time indicating voltage amplitude to switch to an active condition, and impedance switching means operatively connected to said threshold switch and having a high impedance path and being responsive to the active condition of said threshold switch for changing said high impedance path to a low impedance path, said impedance switching means being adapted to be connected to the carrier section tuned circuit means such that the low impedance path selectively detunes the circuit means to inhibit the emission of carrier signals.

5. The combination of claim 4 wherein the tuned circuit means is a modulator of the transmitter and the low impedance path selectively clamps the tuned circuit means to a reference potential.

6. The combination of claim 4 wherein the impedance switching means is a semiconductor controlled rectifier and the low impedance path operates to voltage clamp the tuned circuit means to a reference potential for selectively making the same inoperative.

7. The combination of claim 6 further including a resistor connected to the controlled rectifier such that when the rectifier provides a low impedance path current flows through the resistor for providing a voltage thereacross, and an operator indicating means connected across said resistor and responsive to the voltage thereacross for providing an alerting signal.

8. The combination of claim 7 wherein said operator indicating means includes an audio tone generator responsive to the voltage applied thereto for generating an audio tone signal.

(References on following page)

References Cited

UNITED STATES PATENTS

| | | | |
|---|---|---|---|
| 2,510,316 | 6/1950 | Marlowe | 325—57 |
| 2,719,284 | 9/1955 | Roberts. | |
| 2,766,324 | 10/1956 | Peth | 325—57 |
| 3,210,665 | 10/1965 | Street | 325—64 |
| 3,217,255 | 11/1965 | Broadhead | 325—64 |
| 3,292,085 | 12/1966 | Black | 325—64 |
| 3,304,501 | 2/1967 | Ruthenberg | 325—64 |

RALPH D. BLAKESLEE, Primary Examiner

ALBERT J. MAYER, Assistant Examiner

U.S. Cl. X.R.

325—57, 64, 166, 169, 186, 187